Sept. 15, 1936.  A. D. MacLEAN  2,054,481
GAS FURNACE CONTROLLING MECHANISM
Filed Aug. 5, 1930   2 Sheets-Sheet 1
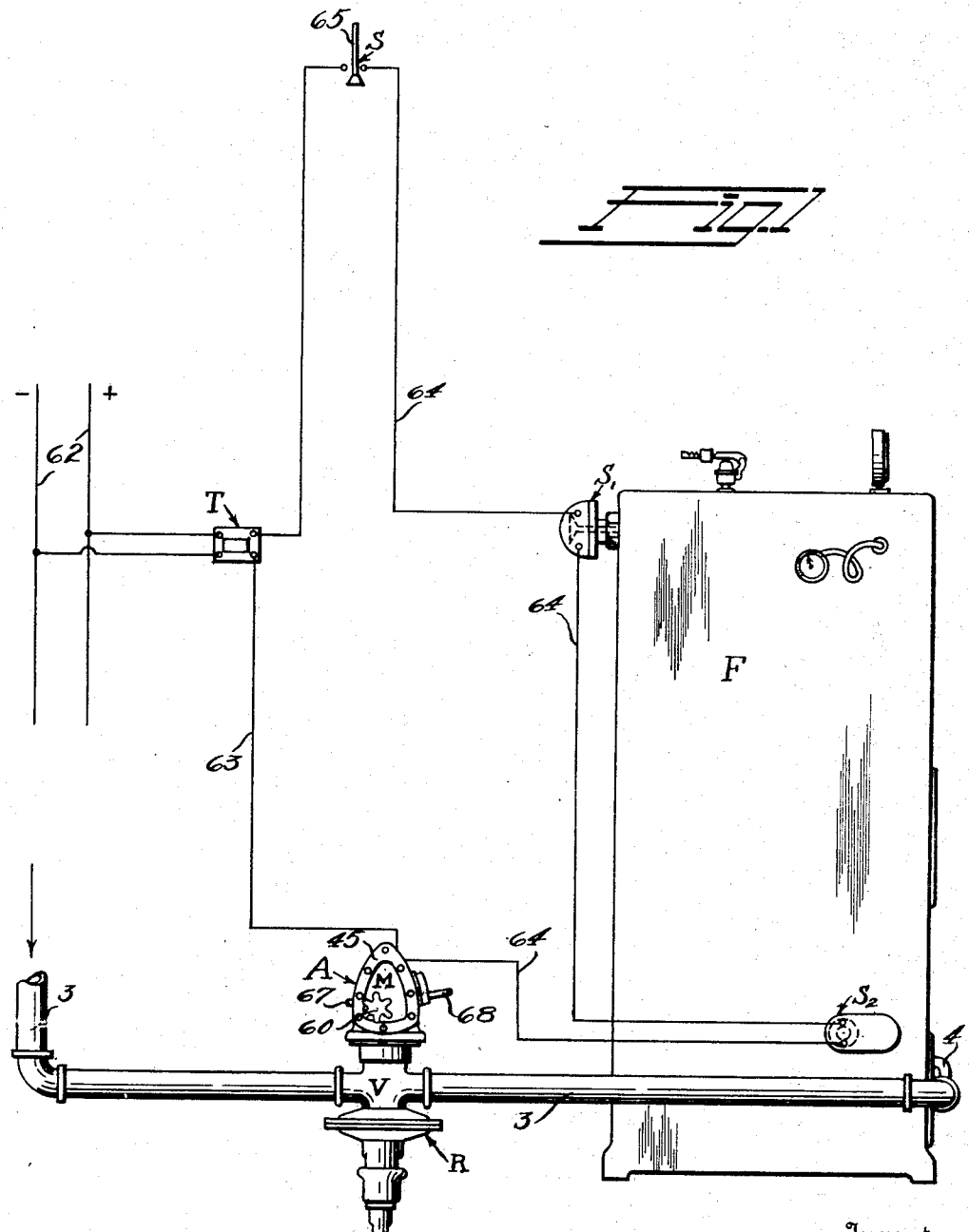
Inventor
Allen D. MacLean
By
Strauch & Hoffman
Attorneys

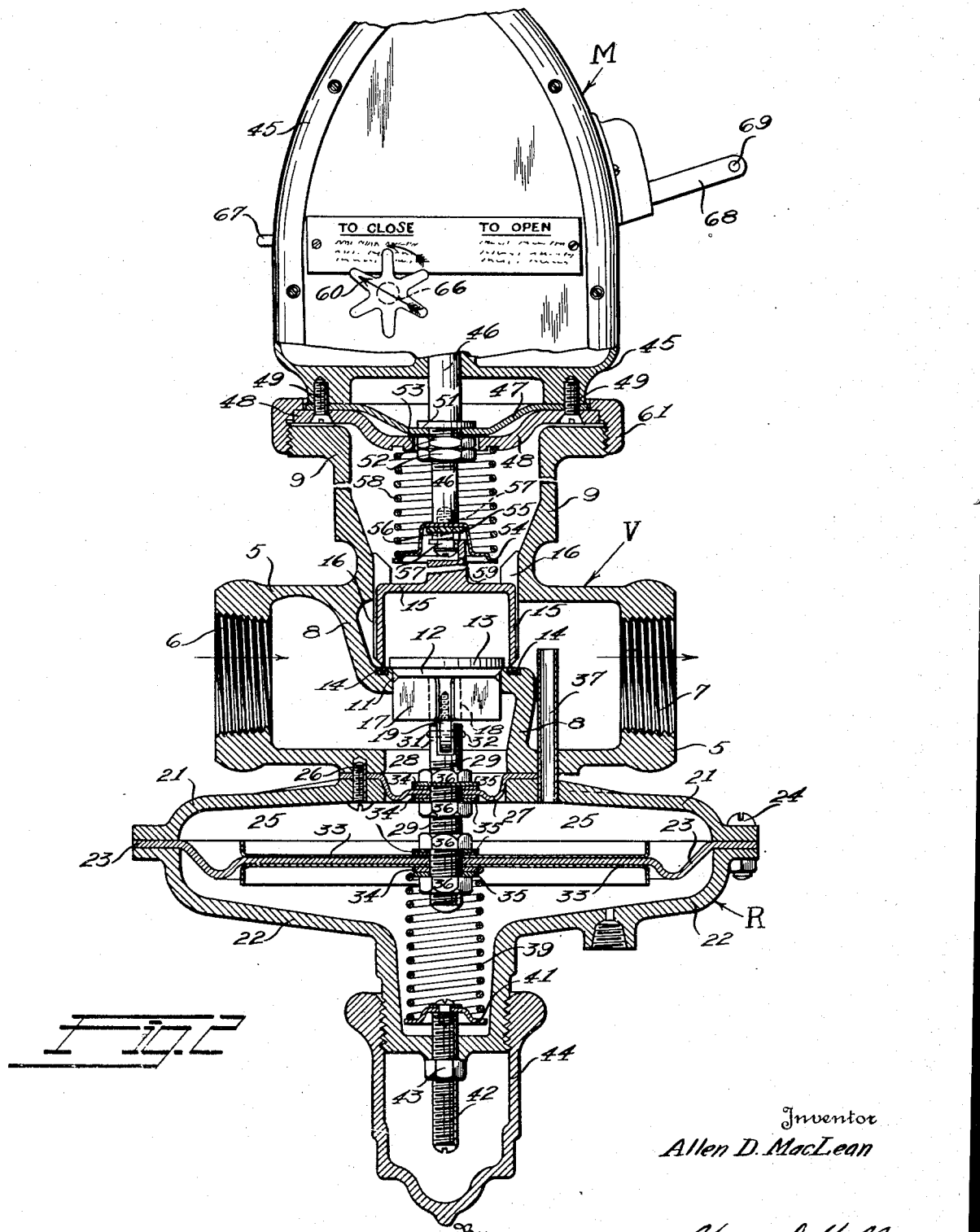

Patented Sept. 15, 1936

2,054,481

UNITED STATES PATENT OFFICE 2,054,481

GAS FURNACE CONTROLLING MECHANISM

Allen D. MacLean, Pittsburgh, Pa., assignor to Pittsburgh Equitable Meter Company, Pittsburgh, Pa., a corporation of Pennsylvania Application August 5, 1930, Serial No. 473,279

2 Claims. (Cl. 137—139)

This invention relates to controlling mechanism for gas furnaces. More particularly, the invention is concerned with the efficient control and regulation of the flow of gas through a supply line to the burners of a gas furnace.

In installations of this nature the usual practice is to insert several valves in the supply line, which valves comprise a conventional pressure regulating valve, a hand operated stop valve and one or more automatic valves operable in response to temperature or other conditions at various points in the system. Examples of the latter (automatic) type of valve are valves controlled by solenoids or motors arranged in electric circuits through which the flow of current is regulated by thermostatic switches that make and break the circuit in response to temperature variations in the heated rooms, within the furnace and adjacent the pilot light.

When a plurality of separate valves is disposed in the gas supply line in the manner just described, the pressure drop between the main and the burners becomes undesirably high and the final pressure is then too low for proper and efficient operation. This is because the total pressure drop is equal to the sum of the separate drops caused by frictional resistance in the several individual valves. Accordingly, it is a primary object of the present invention to remedy this condition by providing a system wherein a single valve port is utilized in the supply line, which port is opened or closed by one or more valves in response to a plurality of independent variations in such conditions as pressure, temperature, etc. This valve port may be formed in a single valve body, whereby the total pressure drop is only that resulting from the resistance caused by a single valve.

It is an object of this invention to provide, in a system of the class described above, a valve assembly having a single valve port or passageway that is opened and closed in response to pressure variations in the gas supply line, in response to various temperature or other changes in the heating system, and in response to manual effort. More specifically, it is a major object of the present invention to provide, in a gas furnace system, a valve assembly in the gas supply line having a single passageway controlled by a pair of independently actuated valves, one of which is movable in response to variations in gas pressure and the other of which is movable by a motor. The motor may be operable manually as well as by power, and preferably comprises an electric rotary motor connected in a circuit involving several switches automatically operable in response to changes at various points in the heating system. A simple solenoid motor may be used if desired.

Another object of my invention is to provide a valve assembly having a single passageway controlled by several valves designed and arranged in such manner that neither valve will have any tendency to "stick", i. e., resist movement thereof during operation. In this connection, it is an object to maintain said valves in independent relationship and out of contact with one another in spite of the fact that they have virtually a common seat.

A further important object of the present invention resides in the provision of a valve assembly wherein several valves are adapted to close a common valve port, one of said valves being motor-controlled, and wherein the motor-controlled valve has no tendency to be closed by fluid pressures in the assembly.

Other objects of this invention will appear in the following detailed description and appended claims when studied in conjunction with the accompanying drawings in which:

Figure 1 is an elevational view showing, somewhat diagrammatically, the system of this invention, including a gas furnace and a special valve assembly in the gas supply line; and Figure 2 is an enlarged view, mainly in vertical cross section, of the valve assembly seen in Figure 1.

With further reference to the drawings, wherein like characters are employed to designate like parts, the letter F indicates any conventional type of gas furnace to the burners of which (not seen) gas is fed by way of a supply pipe 3 and manifold inlet tubes 4. Controlling mechanism, including a valve assembly A inserted in the pipe line 3, is provided for governing the flow of gas to the furnace.

The valve assembly A comprises a complete valve V, a motor assembly M, and a pressure regulator R. The complete valve comprises a body casting 5 having threaded inlet and outlet ends 6 and 7 respectively, for connection with the inlet piping 3, a partition 8 separating the ends 6 and 7, and an upper supporting and housing section 9. The partition 8 has a vertical circular port or opening therein for establishing communication between ends 6 and 7, which opening terminates at its upper edge in a seat shaped, as indicated, to cooperate with the conical seating portion 12 of a pressure-regulating valve 13. Surrounding this seat the partition carries an annular leather pad 14 that forms a horizontal seat for the relatively sharp free circular edge of a second valve 15 of inverted cup shape.

The valve 15 is designed to be reciprocated vertically in several ways (later described) and is properly guided during such movement by a set of guides 16 formed in the casting 5. The valve 13 is likewise reciprocable, and is guided by free engagement of its fins or spider 17 with the wall of the port 11. The spider 17 has a central hub 18 into which is screwed one end of an actuating pin 19. The latter is operated by the regulator R in the following manner.

The regulator comprises a pair of complemental casing sections 21 and 22 flanged at their edges and secured together, with a flexible diaphragm 23 gripped therebetween, by bolt and nut assemblies 24. The diaphragm cooperates with the section 21 to form a pressure chamber 25. The section 21 is rigidly secured to the lower side of the valve casting by screws 26, a flexible diaphragm 27 being gripped between the casting and said section to prevent fluid from entering the pressure chamber 25 by way of an opening 28 in the casting. This diaphragm serves a further purpose as will appear later.

A bolt 29 has a clevis-shaped upper end 31 pivotally connected by a pin 32 with the valve actuator 19, and has its body portion threaded and projected downwardly through the diaphragms 27 and 23. The latter has a pair of stabilizing and strengthening pans 33 backed against the opposite sides of its central portion and firmly secured thereto by washer assemblies 34, 35 and a pair of nuts 36 screwed on the bolt 29. The washers 34 preferably are made of sheepskin and the washers 35 of tin. A similar set of washers and nuts is utilized to secure diaphragm 27 to, and seal it with respect to the bolt 29.

Regulating pressure fluid is admitted to the chamber 25 from the discharge side of the valve body by way of a tube 37 that is driven through vertically aligned openings in the casting 5 and the section 21. The joint is rendered leak proof with white lead. The pressure exerted on the diaphragm 23 is resisted by a coil spring 39 that is interposed between said diaphragm and an abutment 41 secured to the upper end of a screw 42 that is threaded through the lower end of the section 22. This screw is provided with a lock nut 43 whereby it may be adjusted and held in any predetermined position to vary the resistance of the coil spring. A closure cap 44 covers the lower end of the screw and section 22.

The regulator just described functions in substantially the same manner as do similar mechanisms of this type. It controls the position of the valve 13 in response to pressure variations on the furnace side of the valve. The valve 13 has no tendency to stick or resist movement, since it is freely guided, is pivotally connected to the operating bolt 29 and is never in contact with the valve 15 despite the fact that both valves have virtually a common seat adjacent a single valve port. The auxiliary diaphragm 27 is designed to balance the valve 13, i. e., the upward force exerted by inlet pressures on valve 13 is counterbalanced by a downward force exerted by inlet pressure upon said diaphragm. The other valve, 15, is operable by the motor assembly M in the following manner.

The motor assembly M comprises a casing 45 that houses an electric motor (not seen) which raises a plunger 46 when current is supplied to the motor and which releases said plunger when the electrical circuit is broken. For a more complete disclosure of this motor mechanism reference may be had to Patent #1,678,202 wherein there is fully shown a motor which, upon receiving current, makes a certain number of turns while simultaneously lifting a valve stem by way of a train of gears and a rack. When the valve reaches fully open position the motor stalls, and holds said valve in such position until the current is cut off, at which time a spring causes the valve to move to closed position.

The plunger 46 projects downwardly through a flexible diaphragm 47 that is secured to the lower side of the housing by a dished plate 48 and machine screws 49. The plunger has an integral collar 51 against which the diaphragm is locked and sealed by a pair of nuts 52 that are screwed on a threaded portion of the plunger. The plate 48 has a central opening 53 to permit vertical movement of the plunger and nuts.

An abutment plate 54 is telescoped on the lower end of plunger 46 and prevented from falling off by a washer 55 held in engagement with the plunger end by a collar 56. The collar is formed integral with a special screw 57 which is screwed into the plunger end axially thereof. A coil spring 58 surrounds the plunger 46 and reacts between the dished plate 48 and the abutment plate 54 with a tendency to thrust the plunger downwardly. The head of the special screw 57 is inserted in a forked and slotted portion 59 of the valve 15, whereby the latter is moved vertically in response to plunger reciprocation and is freely guided during such movement by the set of guide elements 16.

The motor assembly just described is mounted, as illustrated, upon the supporting section 9 of the valve casting 5, and is secured thereto by a threaded locking collar 61. It will be observed that any gas pressures, tending to seat the valve 15 or maintain it closed, are counterbalanced by the upward pressures against the diaphragm 47. When electrical current is flowing through the motor the plunger 46 is lifted against the resistance of the spring 58 and the valve 15 is then in open unseated position. However, should the electric circuit be broken, the plunger will be released and the valve firmly seated by the coil spring 58. Current normally flows through the motor and is subject to interruption only when such conditions arise in the furnace system that it becomes desirable to close the valve 15. An automatic current control system is provided, as follows (see Figure 1):

Power is taken from a pair of mains 62 and stepped down in a transformer T for use in a valve controlling circuit. This circuit comprises a line 63 leading directly from the transformer to the motor and a line 64 passing from the transformer to the motor by way of several automatic switches S, S₁ and S₂. The circuit through the motor is completed only when all of these switches are closed.

The switch S is adapted for disposal in a room heated by the furnace and includes a thermostatic element 65 which moves downwardly to break the circuit (as indicated) when the room temperature exceeds a predetermined maximum. The valve 15 then closes to shut off the supply of gas to the burners. When the temperature is below said maximum the element 65 is disposed high enough to maintain an unbroken circuit.

The switch S₁ is, in the illustration, in all respects like switch S except for the fact that it is designed to respond to furnace conditions. The "furnace condition" of a hot water furnace is the temperature of the water heated thereby; of a hot air furnace it is the temperature of the air being heated; and of a steam boiler it is either the steam temperature, steam pressure or the water level. When the "furnace condition" arrives at a selected or undesirable predetermined point, (as when the temperature becomes too high, the pressure too high or the water level too low), the switch $S_1$ opens the circuit and permits the valve 15 to close. When furnace conditions are normal the switch is closed.

The third switch, $S_2$, is like the switch S except that it is opened and closed in a reverse manner. That is to say it responds in such manner to temperatures induced by a pilot light that it remains closed when subjected to heat from the pilot light and opens when there is no heat, as when the pilot light is out. The pilot light is the small perpetual flame adjacent the gas burners and it receives its gas from the line 3. Hence should the pilot go out for any reason, it is desirable and necessary that valves 15 be closed to prevent the flow and dangerous accumulation of unburned gas in the furnace. The condition of the pilot light is intended to be embraced in the expression "furnace conditions" heretofore referred to.

Under certain conditions it may be desirable or necessary to operate the valve 15 manually. For this purpose a manipulating knob 60 is provided at one side of the housing 45, this knob being secured to a shaft 66 that is journaled through the housing and designed to engage the internal mechanism to lift the plunger 46 when the knob is turned counter-clockwise. A small locking plunger 67 is mounted to slide axially in the housing wall and, when the valve 15 is almost fully open, this plunger may be pressed inwardly into the path of the internal mechanism to latch the plunger 46 against return movement by the spring 58.

An arm 68 projects outwardly from one side of the motor housing 45. This arm is oscillatably mounted and internally connected with the plunger 46 in such manner that the outer end of the arm swings up and down simultaneously with the respective closing and opening movements of the valve 15. The swinging end of the arm has a hole 69 therein for connection with a chain or the like (not shown) that may be hooked up with the damper or air supply regulator of the gas furnace. In this manner an automatic regulation of the air supply may be had, with the damper control positioned to correspond properly with the position of the gas valve 15.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. A valve assembly comprising, in combination, a valve body having a single port for establishing a flow therethrough, a valve seat formed around said port, a shut off valve designed to cooperate with said seat, an electric power unit mounted adjacent said valve and connected thereto to operate the same, a balancing element disposed between said valve and said power unit, said element being connected to said valve and having sufficient area exposed to any pressure fluid flowing through said port to counterbalance any fluid pressure tending to close the valve, whereby the latter may easily be operated by said power unit, a second valve designed to cooperate with said single port and arranged to move independently of said shut off valve, a pressure responsive device connected with said second valve to control the latter, and means for counterbalancing the fluid pressures tending to close said second valve.

2. A valve assembly comprising a valve body having a port therethrough, a valve seat formed around said port, a shut off valve designed to cooperate with said seat, an electrical power unit mounted in alignment with said valve and adapted to operate the same, a second valve designed to cooperate with said port, means on said second valve cooperating with said port for guiding the movement thereof, a pressure responsive device connected to said second valve to control the latter, and means for counterbalancing the fluid pressure tending to open said second valve.

ALLEN D. MacLEAN.